United States Patent
Akinfiev et al.

(10) Patent No.: US 6,952,978 B2
(45) Date of Patent: Oct. 11, 2005

(54) DEVICE FOR A WORK ELEMENT HAVING TWO DEGREES OF MOBILITY

(75) Inventors: Teodor Akinfiev, Arganda Del Rey (ES); Manuel Ángel Armada Rodríguez, Arganda Del Rey (ES); Pablo Gonzalez De Santos, Arganda Del Rey (ES); María Antonia Jiménez Ruiz, Arganda Del Rey (ES); Andrés Mauricio Uquillas Loaiza, Arganda Del Rey (ES)

(73) Assignee: Consejo Superior de Investigaciones Cientificas, Madrid (ES)

( * ) Notice: Subject to any disclaimer, the term of this patent is extended or adjusted under 35 U.S.C. 154(b) by 0 days.

(21) Appl. No.: 09/914,432

(22) PCT Filed: Dec. 22, 2000

(86) PCT No.: PCT/ES00/00484

§ 371 (c)(1),
(2), (4) Date: Dec. 3, 2001

(87) PCT Pub. No.: WO01/47734

PCT Pub. Date: Jul. 5, 2001

(65) Prior Publication Data

US 2002/0134188 A1 Sep. 26, 2002

(30) Foreign Application Priority Data

Dec. 28, 1999 (ES) .............................. 9902863

(51) Int. Cl.[7] .............................................. B25J 17/00
(52) U.S. Cl. ............................. 74/490.05; 74/490.03
(58) Field of Search .................... 74/479.01, 490.01, 74/490.03, 490.05, 490.09

(56) References Cited

U.S. PATENT DOCUMENTS

| | | | | |
|---|---|---|---|---|
| 4,256,947 A | * | 3/1981 | De Candia | 219/79 |
| 4,618,309 A | * | 10/1986 | Gregg et al. | 414/753.1 |
| 4,962,676 A | * | 10/1990 | Vainstock | 74/490.1 |
| 5,248,923 A | * | 9/1993 | Kimura et al. | 318/568.2 |
| 5,399,951 A | * | 3/1995 | Lavallee et al. | 318/567 |
| 5,421,695 A | * | 6/1995 | Kimura | 414/744.5 |
| 5,886,494 A | * | 3/1999 | Prentice et al. | 318/625 |
| 5,964,124 A | * | 10/1999 | Nunes et al. | 74/490.01 |
| 6,328,510 B1 | * | 12/2001 | Hanrath et al. | 409/235 |
| RE37,731 E | * | 6/2002 | Ogawa et al. | 74/490.01 |

FOREIGN PATENT DOCUMENTS

| | | |
|---|---|---|
| EP | 0320498 | 6/1989 |
| EP | 0401751 | 12/1990 |
| EP | 0546592 | 6/1993 |
| EP | 0672507 | 9/1995 |

* cited by examiner

Primary Examiner—David M. Fenstemacher
(74) Attorney, Agent, or Firm—Klauber & Jackson

(57) ABSTRACT

A working element with two degrees of mobility, which, with the assistance of two motors manages to move two movable links, one of them acting on the working element, this is a method which is distinguished in the simultaneous action on a working element with the assistance of another movable link. The guidance of a working element with two degrees of mobility which has two motors one of which is housed in the base and connected kinematically with an extreme of the first movable link located in the base with possibility of movement and the other motor connected kinematically with an extreme of the second movable link, and the working element which is connected with the other extreme of the second movable link.

6 Claims, 4 Drawing Sheets

DEVICE FOR A WORK ELEMENT HAVING TWO DEGREES OF MOBILITY

FIELD OF THE INVENTION

The invention pertains to the mechanical engineering sector, and in particular can be used in robotics, in Cartesian desks and other devices.

BACKGROUND OF THE INVENTION

In known technical solutions [1–5], the following is habitually employed.

The handler which is known, with two degrees of mobility, (FIG. 1) has two motors (2,3) one of which (2) is housed in the base and is kinematically connected with an extreme of the first movable link (5) housed in the base (1), with possibility of movement, and the other motor (3) is kinematically connected with an extreme of the second movable link (9) and the working element (4), which is connected with the other extreme (10) of the second movable link (6).

In this technical solution, the second motor (3) is fastened to the other extreme of the first movable link (5).

The drawbacks of this construction concern the fact that the second motor is mobile (during the movement of the first movable link this motor is in motion) which increases the mass of the parts in movement. This also reduces the speed and has an unnecessary energy consumption. In addition, the device known has an open kinematic train which leads to deficiencies in the stiffness of the construction and as a result thereof the need to augment the mass to improve this stiffness.

1. Industrial robot.
Patent number: EP 0320498
Publication date: Jun. 14, 1998
Inventor(s): WINTER ALFRED ING; SCHENDL ADOLF DIPL-ING
EC Classification: B25J9/02B2; B25J18/02; B25J19/00D2; B23Q1/40; B23Q1/62A5; B23Q1/00B2; B23Q11 /00C
2. High cadence industrial robot for moving a tool along three orthogonal Cartesian axes.
Patent number: EP0546592
Publication date: Jun. 16, 1993
Inventor(s): VIVIER YVES CHARLES BERNARD (FR); FAYEL
EC Classification: B25J9/00H1; B25J9/02B
3. Robot for guiding movements and control method.
Patent number: EP0574330 A1 931215
Publication date: Mar. 21, 1995
Inventor(s): LAVALLEE STEPHANE (FR); TROCCAZ JOCELYNE (FR)
EC Classification: G05B19/423
4. Climbing robot movable along a trestle structure, particularly of a pole for high-voltage overhead electric lines.
Patent number: EP 0401751
Publication date: Dec, 12, 1990
Inventor(s): PARIS LUIGI (IT)
EC Classification: B62D57/024
5. Method for controlling the movements of an industrial robot at and near singularities.
Patent number: EP 0672507
Publication date: Sep. 20, 1995
Inventor(s): SNELL JOHN-ERIC (SE)
EC Classification: B25J9/16L6
6. U.S. Pat. No. : 4,962,676 (1990)
U.S. Pat. No. : 5,964,124 (1999)
U.S. Pat. No. : 6,328,510 (2001)
U.S. Pat. No. : 5,886,494 (1999)
U.S. Pat. No. : 5,421,695 (1995)
U.S. Pat. No. : 5,248,923 (1993)
U.S. Pat. No. : 4,618,309 (1986)
U.S. Pat. No. : 4,256,947 (1981)
U.S. Pat. No. : RE37,731 E (2002)

BRIEF DESCRIPTION OF THE INVENTION

The method of displacement of a working element with two degrees of mobility, which, with the assistance of two motors manages to move two movable links, one of them acting on the working element, this is a method which is distinguished in the simultaneous action on a working element with the assistance of another movable link.

The device of a working element with two degrees of mobility as claimed, has two motors one of which is housed in the base and connected is kinematically with an extreme of the first link located in the base with possibility of movement and another motor connected kinematically with an extreme of the second movable link, and the working element which is connected with the other extreme of the second movable link, this guidance is that which is distinguished in the fact that the second motor is housed in the base and an extreme of the second movable link connected with this motor is stiffened in the base with possibility of movement and the other extreme of the first movable link is connected with the working element.

DETAILED DESCRIPTION OF THE INVENTION

The purpose of the invention is to augment the stiffness of the construction, reduce its mass, reduce the energy consumption and increase the speed.

To achieve this purpose, the second motor (3) in the device proposed (FIG. 2) is housed in the base (1); connected with this motor, an extreme (9) of the second movable link (6) is fastened to the base (1) with the possibility of movement, and the other extreme (8) of the first movable link (5) is joined to the working element (4).

This kinematic train provides the possibility of situating both motors in the base (both motors are stationary with respect to the base), in order to reduce the energy consumption and increase the speed simultaneously, in exchange for diminishing the mass of the moving parts. In addition, the kinematic train proposed is closed (the movable links, together with the base form a triangle which is a rigid construction), which increases the stiffness in the anchoring of the working element with regard to the base and additionally reduces the mass of the moving parts.

The job of the handler is carried out in the following manner: For movements of the working element parallel to the base, both motors start up at the same time with the same speed (it is understood that the transmission ratio in the kinematic train "motor-movable link" is the same for both motors and the lengths of both movable links are equal; if either of these conditions is not met, the speed of the motors has to be different). As long as the distance between the extremes of the movable links does not vary, the angles of the triangle "base—first movable link—second movable link" do not change, the triangle moves along the base together with the working element. The change of direction of rotation of the motors permits the working element to be moved in similar form, but in the opposite direction.

For movements of the working element perpendicular to the base, both motors have to turn in different directions with equal speed (it is understood that the transmission ratio in the kinematic train "motor-movable link" is the same for the motors, and the lengths of the two movable links are equal; if either of these conditions is not met, the speed of the motors has to be different). As long as the distance between the extremes of the movable links diminishes, the angle at the vertex of the triangle "base—first movable link—second movable link" is decreasing (the triangle continues to be isosceles). This leads to an increase in the height of the triangle and a movement of the working element perpendicular to the base. The movement in reverse of the working element is fulfilled in a similar manner by changing the direction of rotation of each motor.

For movements of the working element in an arbitrary manner, the motors must start at a different speed (the direction of rotation can be the same or in opposition, depending on the required direction of the movement of the working element).

It is to be pointed out that in the construction proposed, it is particularly easy to execute movements of the working element parallel to the base. In contrast to known constructions, during their movement, both motors apply forces favouring the movement whereby the forces are added. The control algorithm is also very simple, it is necessary to maintain the motor speeds equal. This is why the use of this handler is especially effective for walking robots, which usually move in one direction generally, and only occasionally have to turn in order to move in a perpendicular direction.

Figure 1:
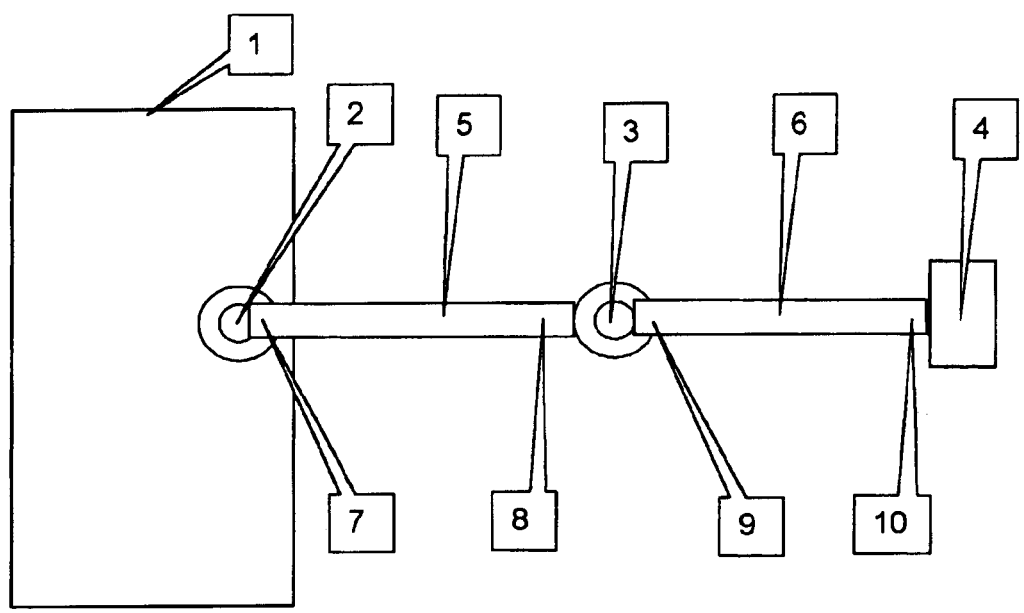
FIG. 1. The known guidance of movement of the link with two degrees of mobility.
Figure 2:
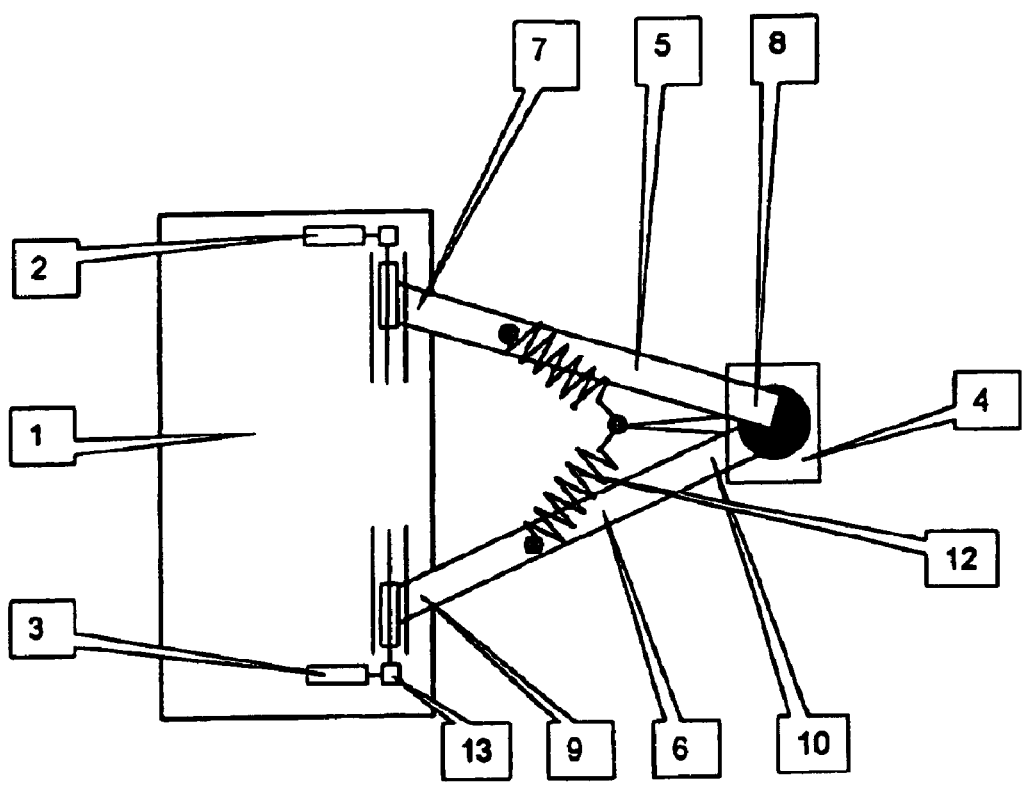
FIG. 2. The proposed guidance of movement of the link with two degrees of mobility.

List of the numbering references of the elements shown in the FIGS.

1. The base of the guidance arrangement
2. The first motor
3. The second motor
4. The working element
5. The first movable link
6. The second movable link
7. The first extreme of the first movable link
8. The second extreme of the first movable link
9. The first extreme of the second movable link
10. The second extreme of the second movable link
11. The foot of the robot with the guidance for vertical movement (this guidance is not shown in the drawing).
12. Spring
13. Self-blocking kinematic connection between at least one of the motors 3 and its corresponding movable link 6

DESCRIPTION OF AN EMBODIMENT OF THE INVENTION

In the device proposed, the connection between the working element and one of the movable links can be implemented by means of a ball or flat articulation and the connection with the other movable link can be rigid. In this case the working element shall maintain its angular position with respect to one of the movable links during the movement.

In the device proposed, the connection between the working element and both movable links can be implemented by means of a ball or flat articulation. In this case the working element shall be unable to maintain its angular position with respect to the movable links during the movement.

In the device proposed, when there exists an articulated union between the working element and both movable links, there could be an additional spring (or springs) (12), one of its extremes connected with a movable link, the other extreme connected with the other link and its intermediate point connected with the working element. In such a case, if there are no external forces acting on the working element, the latter shall maintain its angular position with respect to the base. If external forces act on the working element, the latter can change its angular position relative to the base, but when these forces cease to act, the working element shall recuperate its angular position with respect to the base. This is important, especially when the operation is utilised for the horizontal actuation of the leg of a walking robot.

In the device proposed, the lengths of the movable links can be different, however it is preferable they be identical (in this case it is easier to move the working element over the required trajectory).

In the device proposed, the connection between the base and an extreme of the movable links can be made in such a manner that it permits the movement of these extremes over an arbitrary trajectory. Notwithstanding, it is preferable that the movement of these extremes be over trajectories situated over parallel lines or over a same straight line. In this case it is easier to move the working element along the required trajectory.

In the device proposed it is desirable (but not mandatory) to make a kinematic connection between at least one of the motors and the corresponding movable link with a self-blocking transmission (13) (for example with the aid of a nut and spindle assembly). In that case it is possible to disconnect the motors when the device is stopped and the working element can maintain its position due to the self-blocking effect. This shall permit a reduction in energy consumption.

In the device proposed it is desirable to have an articulated union between the motors and the movable links in the kinematic train, it is possible to employ additional elements—guide rails.

In the case of there being various working elements (various devices) on the same base, the lengths of the movable links could be equal. However the most interesting case arises when for at least two working elements, the lengths of the movable links corresponding to a working element are greater than those corresponding to the other working element. This permits the working zone to be enlarged (area which the working element can reach) because during the movement of one working element, the other shall be unable to hinder the first. This is especially important for walking robots for which it is possible to organise the movement of each working element (robot legs) over the entire base.

For at least two working elements the connection between the base and the first extremes of the corresponding movable links is made such that the movement trajectories of the extremes of the movable links corresponding to the first working element and the movement trajectories of the extremes of the movable links corresponding to the second working element are situated on parallel lines.

Figure 3:
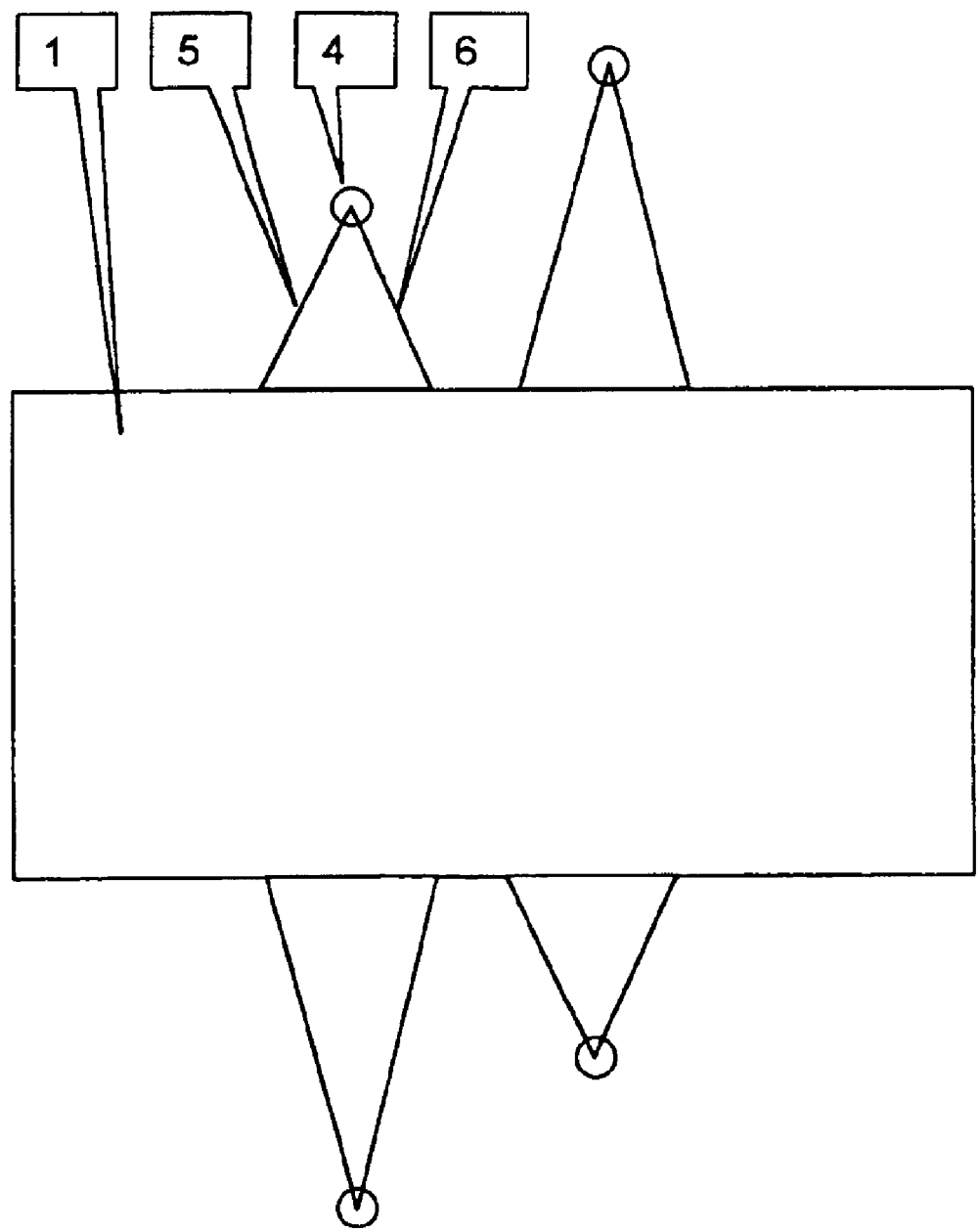
FIG. 3. Example of embodiment of the proposed guidance—the walking robot, in which four proposed guidance arrangements are being employed (viewed from above).
Figure 4:
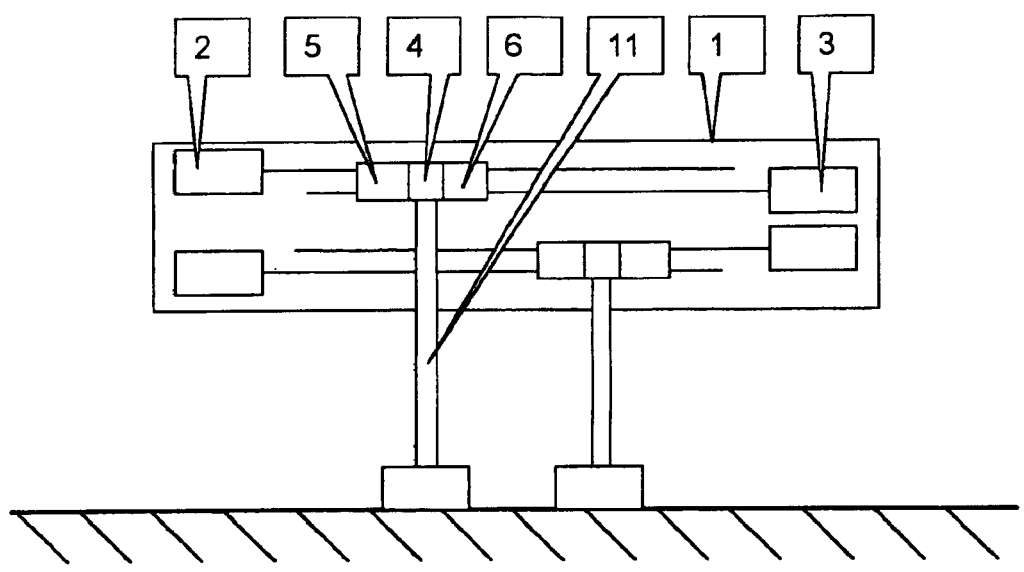
FIG. 4. Example of embodiment of the proposed guidance—the walking robot, in which four proposed guidance arrangements are being employed (viewed from the side).

An example of a transmission application for a four-legged robot is shown in FIGS. 3 and 4.

What is claimed is:

1. Device for guiding a working element with two degrees of mobility comprising:
    a base,
        a first movable link comprising a first extreme and a second extreme,
        a second movable link comprising a first extreme and a second extreme,
        a first motor being housed in the base and connected kinematically with the first extreme of the first movable link by means of a first articulation,
    a first guiding element which guides the first extreme of the first movable link along trajectories situated over a first straight line determined by said first guiding element,
    a second motor also being housed in the base and connected kinematically with the first extreme of the second movable link by means of a second articulation,
    a second guiding element which guides the first extreme of the second movable link along trajectories situated over a second straight line determined by said second guiding element and being parallel to the first straight line,
    a third articulation which connects kinematically the second extremes of the first and second movable links, said second extreme of the first movable link being furthermore connected to the working element, and
    a control algorithm for the first and second motors which controls speed and direction of each of the first extremes of the first and second movable links;
    in order to accomplish a closed and therefore robust kinematic train formed by a triangle defined by the base and both first and second movable links which guides said working element with two degrees of mobility;
wherein the first and second guiding elements are arranged making coincide the first and second straight lines determined by said guiding elements in a unique same straight line over which the trajectories of both first extremes of the first and second movable links are situated; said arrangement of the first and second guiding elements having been provided in order to enable to simplify the control algorithm of the first and second motors, since said arrangement of the guiding elements enables to move the working element parallely to the base by simply acting the first and second motors with a same speed and direction, also enabling to move the working element perpendicularly to the base by acting the first and second motors with a same speed and opposite directions.

2. Device for guiding a working element with two degrees of mobility, according to claim 1, wherein the working element is connected to the second extremes of the first and second movable links by means of a fourth articulation.

3. Device for guiding a working element with two degrees of mobility, according to claim 2, wherein said device for guiding a working element with two degrees of mobility is additionally provided with a spring: a first extreme of said spring being connected to the first movable link, a second extreme of said spring being connected to the second movable link, and an intermediate point of said spring being connected to the working element, in order to maintain angular position of the working element with respect to the base in absence of external forces acting on said working element.

4. Device for guiding a working element with two degrees of mobility, according to claim 1, wherein at least one kinematic connection selected from:
    a kinematic connection between the first motor and the first extreme of the first movable link, and
    a kinematic connection between the second motor and the first extreme of the second movable link,
    is self-blocking.

5. Device for guiding a working element with two degrees of mobility, according to claim 1, wherein a plurality of working elements are connected kinematically to the same base, there being at least a first working element connected to first and second movable links whose lengths are larger than the lengths of first and second movable links corresponding to a second working element.

6. Device for guiding a working element with two degrees of mobility, according to claim 5, wherein four working elements are connected kinematically to the same base:
    at a first side of the base there being:
        a first working element connected to long first and second movable links, and
        a second working element connected to short first and second movable links; and,
    at a second side of the base opposite to the first side of the base there being:
        a third working element connected to long first and second movable links, and
        a fourth working element connected to short first and second movable links.

* * * * *